(12) United States Patent
Hammerum et al.

(10) Patent No.: US 10,683,844 B2
(45) Date of Patent: Jun. 16, 2020

(54) CONTROL OF A WIND TURBINE TAKING FATIGUE MEASURE INTO ACCOUNT

(71) Applicant: VESTAS WIND SYSTEMS A/S, Aarhus N (DK)

(72) Inventors: Keld Hammerum, Hadsten (DK); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/574,456

(22) PCT Filed: May 24, 2016

(86) PCT No.: PCT/DK2016/050143
§ 371 (c)(1),
(2) Date: Nov. 15, 2017

(87) PCT Pub. No.: WO2016/188532
PCT Pub. Date: Dec. 1, 2016

(65) Prior Publication Data
US 2018/0142674 A1  May 24, 2018

(30) Foreign Application Priority Data

May 27, 2015 (DK) .................................. 2015 70315
Nov. 9, 2015 (DK) .................................. 2015 70721

(51) Int. Cl.
*F03D 9/00* (2016.01)
*H02P 9/04* (2006.01)
(Continued)

(52) U.S. Cl.
CPC ........... *F03D 7/0292* (2013.01); *F03D 7/045* (2013.01); *F05B 2270/332* (2013.01); *F05B 2270/404* (2013.01); *Y02E 10/723* (2013.01)

(58) Field of Classification Search
CPC .. F03D 7/0292; F03D 7/045; F03B 2270/332; F03B 2270/404; Y02E 10/723
See application file for complete search history.

(56) References Cited

U.S. PATENT DOCUMENTS 7,822,560 B2 * 10/2010 LeMieux ................ F03D 7/042
290/44
9,605,654 B2 * 3/2017 Wickstrom ............. F03D 17/00
(Continued)

FOREIGN PATENT DOCUMENTS

EP  2302208 A1  3/2011
EP  2541053 A1  1/2013
(Continued)

OTHER PUBLICATIONS

Jose de Jesus Barradas-Berglind, Rafael Wisniewski and Mohsen Soltani, "Fatigue damage estimation and data-based control for wind turbines," Revised on Oct. 3, 2014, Accepted on Nov. 21, 2014; www.ietdl.org, 10 pages.
(Continued)

*Primary Examiner* — Tulsidas C Patel
*Assistant Examiner* — Thomas K Quigley
(74) *Attorney, Agent, or Firm* — Patterson + Sheridan, LLP (57) ABSTRACT

The present invention relates to control of wind turbines where a fatigue load measure is taken into account. Control of a wind turbine is described where a control trajectory is calculated based on a fatigue load measure, the fatigue load measure being determined from a predicted operational trajectory. In embodiments the predicted operational trajectories are calculated by using a model predictive control (MPC) routine, and the fatigue load measure includes a rainflow count algorithm.

15 Claims, 4 Drawing Sheets

(51) Int. Cl.
    *F03D 7/02*          (2006.01)
    *F03D 7/04*          (2006.01)

(56) References Cited

U.S. PATENT DOCUMENTS

| | | |
|---|---|---|
| 2008/0086281 A1 | 4/2008 | Santos |
| 2009/0180875 A1 | 7/2009 | Egedal et al. |
| 2013/0035798 A1 | 2/2013 | Zhou et al. |
| 2014/0248123 A1 | 9/2014 | Turner et al. |

FOREIGN PATENT DOCUMENTS

| | | | | |
|---|---|---|---|---|
| EP | 2743500 A1 * | 6/2014 | ........... | F03D 7/0292 |
| WO | 20140121800 A1 | 8/2014 | | |

OTHER PUBLICATIONS

International Search Report for Application No. PCT/DK2016/050143, dated Aug. 5, 2016.
Danish Search Report for Application PA 2015 70315, dated Dec. 17, 2015.

* cited by examiner

CONTROL OF A WIND TURBINE TAKING FATIGUE MEASURE INTO ACCOUNT

FIELD OF THE INVENTION

The present invention relates to control of wind turbines where a fatigue load measure is taken into account.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

During operation a wind turbine experiences varying climatic conditions and the control system of the wind turbine is designed to take into account these variations. This constant adaptation to the current conditions imposes a certain and a varying level of fatigue to the wind turbine's components.

Existing wind turbines may include a monitoring system which monitors the operation and determine a number of fatigue measures of various components based on monitored signals, such as vibration signals from sensors. If a too high fatigue level is determined of a given component, the turbine may be shut down or operated in a derated mode until the component can be repaired.

The inventors of the present invention have realized that there is a need for further ways of operating a wind turbine taking fatigue exposure into account during operation of the wind turbine.

SUMMARY OF THE INVENTION

It would be advantageous to control a wind turbine in a manner which takes into account a predicted fatigue load measure during the operation of the wind turbine, and which uses the actual operational state in connection with continued operation of the wind turbine in order to determine the predicted fatigue measure.

Accordingly, in a first aspect, there is provided a method of controlling a wind turbine, comprising:
  receiving a current operational state of the wind turbine;
  based on the current operational state, calculate one or more predicted operational trajectories, the one or more predicted operational trajectories include a predicted control trajectory, where a trajectory comprises a time series of at least one variable;
  determine at least one fatigue measure from at least one predicted operational trajectory;
  determine a control trajectory based on the at least one fatigue measure; and
  control the wind turbine based on the control trajectory.

In the present invention, the operation of the turbine is based on a calculated control trajectory. A trajectory is a time series of a variable for a given time slot, which includes the next variable value for the operational parameter related to the variable, as well as a predicted or an expected number of future variable values for the given parameter. For example, the control trajectory may be a pitch trajectory which includes the next pitch command, as well as an expected or a predicted number of future pitch commands.

A wind turbine includes a control system for controlling the various components of the wind turbine, such as the blade pitch setting, the power converter set-points, the yaw motors, etc. During control of the wind turbine, the various components of the turbine are exposed to fatigue. The level of fatigue exposure depends on the imposed control actions.

In the present invention, the control system is arranged for determining at least one fatigue load measure from at least one predicted operational trajectory, i.e. the control system is arranged to determine a predicted fatigue load measure based on the actual operational state and a predicted operation in a future time slot and control the wind turbine based on such predicted or expected fatigue load measure.

This is an advantage since the fatigue impact can be taken into account in the control of the wind turbine directly during the actual operation and based on the actual load conditions.

In connection with mechanical and structural components, two load contribution types are of special importance, extreme loads and fatigue loads. The extreme load is the load where the structure fails due to the stress exceeding the yield strength for the material. Fatigue loads can be thought of as the loss of strength that a material experience when subjected to a cyclic stress history. Fatigue occurs even when the applied loads are far below the material's elastic limit. Embodiments of the present invention advantageously take into account the predicted or expected oscillating impact of the fatigue loads which affects component reliability due to fatigue damage during control of the wind turbine.

In general the fatigue load measure may relate to fatigue of any structures and components of the wind turbine. Important structures include tower fatigue and the fatigue of the various bearings (pitch bearing, main bearing, etc.) and blade fatigue.

In an important embodiment the at least one fatigue load measure includes a rainflow count algorithm. In another embodiment, the at least one fatigue load measure is based on spectral moments. However other fatigue load measures may be used as an alternative or in addition to these.

In important embodiments, the one or more predicted operational trajectories are calculated by using a receding horizon control routine, such as a model predictive control (MPC) routine, in such embodiments, the fatigue load measure may advantageously be calculated in the prediction horizon. MPC algorithms are well suited for wind turbine operation as they directly take into account constraints on the system variables, and may therefore advantageously be used to find optimal operational trajectories within safe operational limits.

Further embodiments are described in connection with the section Description of embodiments.

In further aspects, the invention also relates to a computer program product comprising software code adapted to control a wind turbine when executed on a data processing system, to a controller for a wind turbine, to a wind turbine park controller which is implemented to control at least selected turbines of the wind turbine park. Moreover, the invention relates to a wind turbine being controlled in accordance with any of the various aspects of the present invention.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which:

FIG. 4 illustrates an example of a predicted operational trajectory of an operational variable (FIG. 4A), together with the corresponding rainflow count diagram (FIG. 4B);

DESCRIPTION OF EMBODIMENTS

Figure 1:
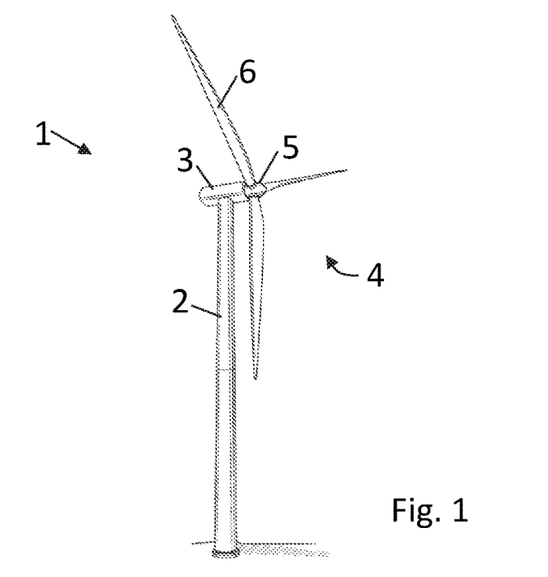
FIG. 1 illustrates an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside the turbine and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
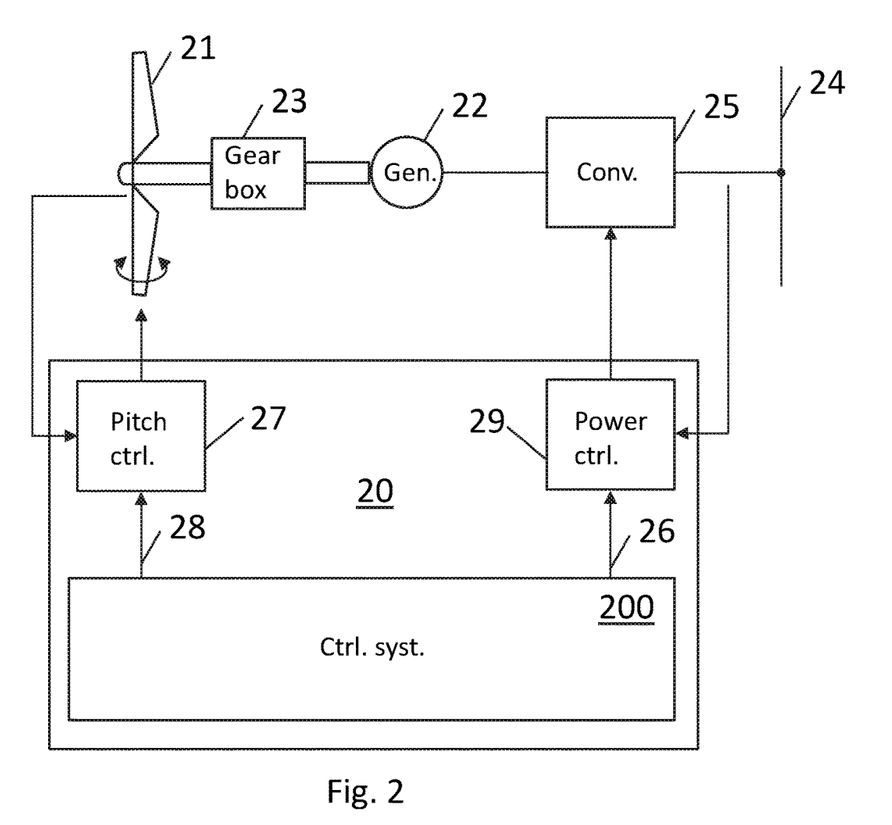
FIG. 2 illustrates an embodiment of a control system together with elements of a wind turbine.

FIG. 2 schematically illustrates an embodiment of a control system 20 together with elements of a wind turbine. The wind turbine comprises rotor blades 21 which are mechanically connected to an electrical generator 22 via gearbox 23. The electrical power generated by the generator 22 is injected into a power grid 24 via an electrical converter 25. The electrical generator 22 can be a doubly fed induction generator, but other generator types may be used. Moreover, a gearbox need not be present.

The control system comprises a number of elements, including at least one controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades.

In embodiments of the invention, the control system 200 is programmed to receive a current operational state of the wind turbine. Based on the current operational state, one or more predicted operational trajectories are calculated and at least one fatigue load measure is determined from at least one predicted operational trajectory. A control trajectory is determined based on the fatigue load measure; and the wind turbine controlled based on the determined control trajectory.

In embodiments, the predicted operational trajectories and the predicted control trajectories are calculated using a model predictive control (MPC) routine.

Figure 3:
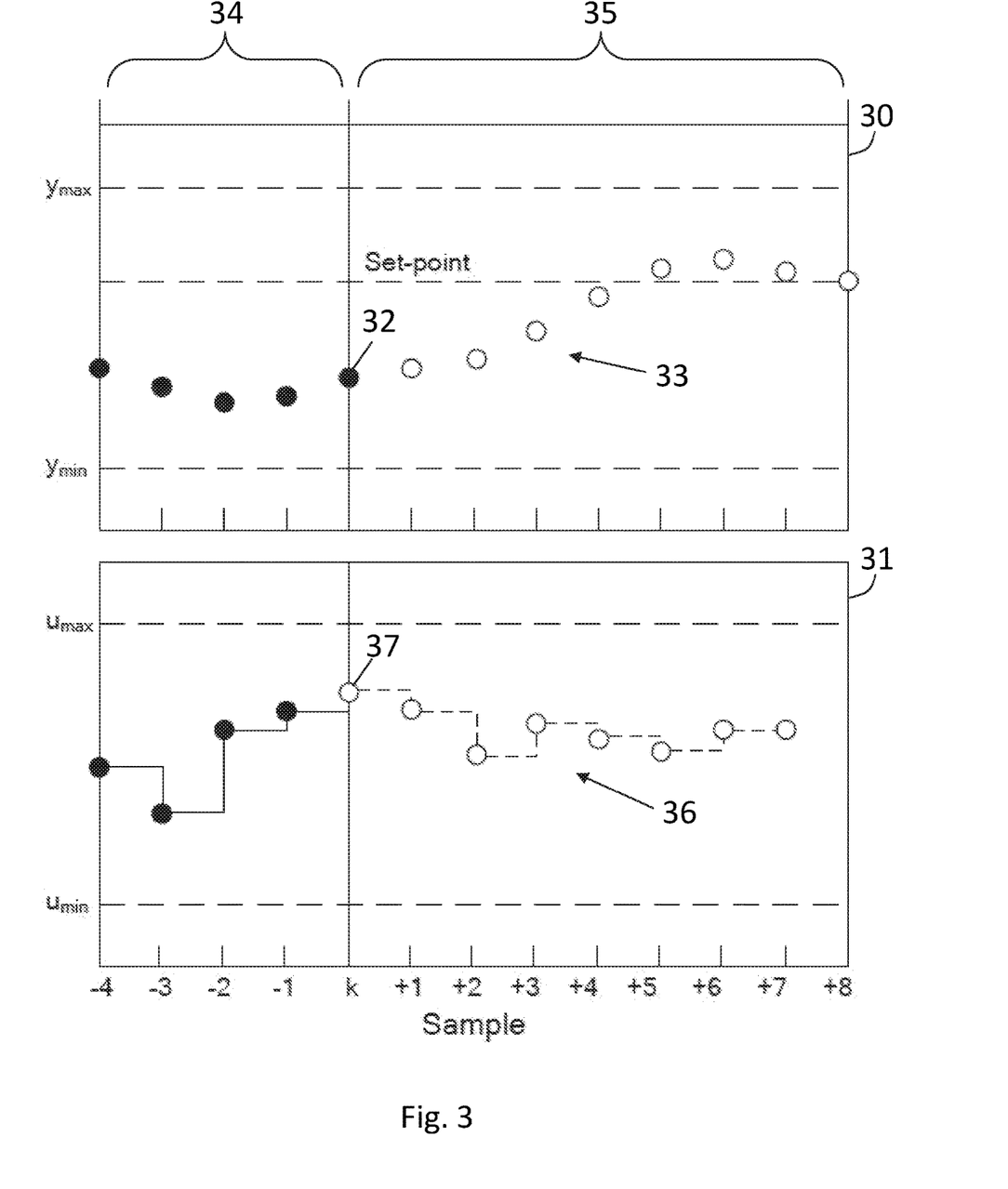
FIG. 3 shows general aspects of an MPC routine in relation to a measured operational variable y and an MPC calculated control variable u

FIG. 3 shows general aspects of an MPC routine in relation to a measured operational variable y and an MPC calculated control variable u. The upper part 30 of the figure shows a state trajectory for the variable y and the lower part 31 of the figure shows a control trajectory for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, $\theta$, rotor angular speed, $\omega$, and tower top position, s, as well as time derivatives of those parameters. Other and more parameters may be used to define the wind turbine state, $x^*$. In general the operational trajectory includes operational parameters which are used to calculate the desired fatigue load measure.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

FIG. 3 shows a trajectory 33 of a measured variable y for a number of discrete time steps. The figure shows the current time, k, as well as a number of past time steps 34 and a number of future time steps 35 (also referred to as the prediction horizon and the control horizon for the state variable y and the control variable u, respectively). Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 32 may be included for trajectories of measured variables. The trajectory may span a time series of a few seconds, such as 5-10 seconds. However the trajectory may be longer or shorter depending on the given implementation.

As an example, the trajectory shows the rotor speed co in a situation where a set-point is given to increase the rotor speed. The trajectory shows the current rotor speed 32 together with the predicted future rotor speeds. Allowed maximum and minimum values are also shown for the illustrated variable.

FIG. 3 further illustrates an example of a general control trajectory 36 determined by use of an MPC algorithm. FIG. 3 illustrates the relationship between an operational state trajectory 33 and a general control trajectory 36.

While the current k-th value is known for measured variables 32, the current value 37 of the control trajectory is calculated by use of the MPC routine.

The figure also shows maximum and minimum allowed values for the control trajectory values of u.

As an example, the trajectory shows the trajectory for the pitch angle, i.e. u=0. Thus a set-point is given to increase the rotor speed, and as a consequence the pitch angle is lowered. The trajectory shows the next pitch setting 37 together with the predicted future pitch settings to fulfil the new set-point setting.

MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2 + \rho f(u, y)$$

With reference to FIG. 3, $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

In the above cost function the fatigue load measure is included in the cost function as a weighted element by the function $\rho\ f(u, y)$. The weight $\rho$ may be used to set the importance of the fatigue measure function in the optimization process.

In an embodiment, the actual fatigue level of a component may be determined as a historic fatigue measure, which based on the actual operation of the wind turbine is determined as the fatigue experienced over a past period. The past period may e.g. be the period experienced since the component was new. For example, in an embodiment, the turbine comprises a monitoring system which monitors the operation and determines a fatigue level of given components. In such an embodiment, the weight may be correlated with the historic fatigue measure. For example, if the historic fatigue level shows little fatigue, a small weight may be assigned, e.g. to prioritize the produced power. If the historic level shows a large fatigue for a given component, the weight may be set larger, to prioritize component life over produced power.

In an embodiment the at least one fatigue load measure is included in the optimization as one or more constraints. This inclusion may be made as an alternative to including the fatigue load measure in the cost function itself, or it may be included as an addition to the fatigue load measure in the cost function itself. This may depend on the specific implementation selected for the optimization problem.

In an embodiment, an optimization criteria used to optimize the at least one cost function is an optimization criterion to keep the fatigue load measure under a predefined level. This may in embodiment be implemented by the cost function, by a properly set constraint, or by a combination of the two.

In embodiments of the present invention, predicted operational trajectories are calculated. The predicted operational trajectories can be implemented in different way in the actual control routine. One important way of implementing operational trajectories are as receding horizon trajectories with a prediction horizon. In an embodiment fatigue measure is determined over the prediction horizon.

The fatigue measure may be implemented in a number of ways. In general a number of fatigue approximation routines exist, such as routines based on variance determination of an oscillating signal. Also spectral analysis method exists.

In an embodiment, the at least one fatigue load measure includes a rainflow count algorithm. This may be implemented as an online rainflow count algorithm which as part of solving the optimization problem continuously calculates the fatigue load measure signal based on the rainflow count.

Figure 4A:
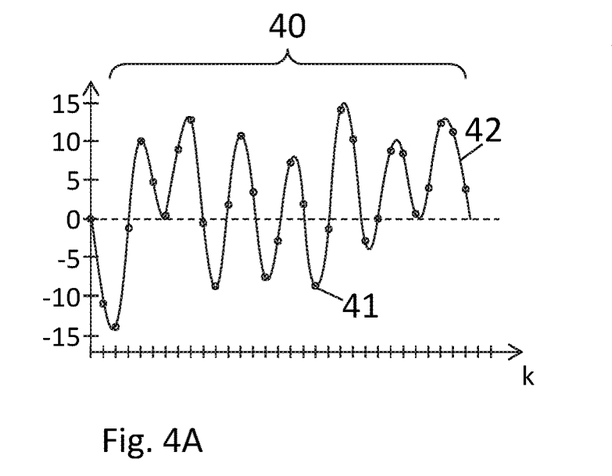

FIG. 4A illustrates an example of a predicted operational trajectory of an operational variable. As an example FIG. 4A illustrates the prediction horizon 40 for the pitch actuation signal over the predicted period spanned by k samples. Each predicted value is marked by an open circle 41. Moreover an interpolated pitch angle position signal is shown by the line 42. FIG. 4A thus illustrates the predicted pitch signal of a given rotor blade that optimizes the used cost function. The figure is provided for illustrative purposes and therefore not representative of a specific load situation or cost function.

Figure 4B:
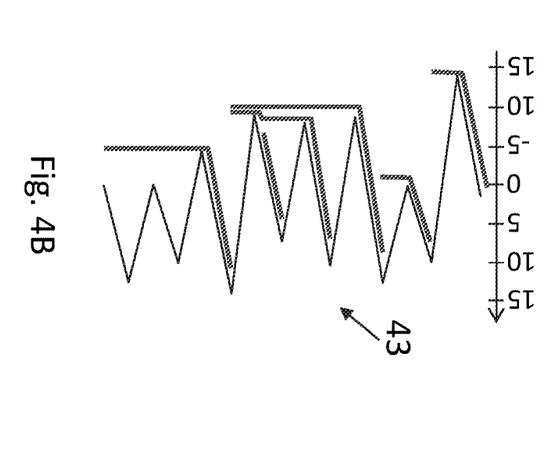

FIG. 4B illustrates the rainflow count diagram 43 of the signal of FIG. 4A. The figure shows only the left going "rain drops", for illustrative purposes, the right going "rain drop" have been omitted.

The rainflow count algorithm outputs a number (M) of stress ranges, $s_i$, or damage equivalent cycles, experienced over the prediction horizon. By use of the Palmgren-Miner sum, a predicted damage contribution over the prediction horizon can be determined.

The Palmgren-Miner sum is defined as:

$$D = \sum_{i=1}^{M} \frac{1}{K} s_i^k$$

D is the damage measure as is generally known in connection with rain flow counting. The sum is over the M cycles identified in the prediction horizon (cf. FIGS. 4A and 4B). Furthermore, k is the material-dependent Wöhler exponent, and K is a material-dependent scaling. These two parameters, k and K, depend on the structure in question and are known.

The function $f(u, y)$ may be set as $f(u, y)=D$. In this manner a predicted damage contribution over the prediction horizon can be determined.

In an embodiment, the at least one fatigue load measure is determined based on spectral moments. In such embodiment the spectral moments are used to estimate the experienced fatigue damage of a given component.

Using the example of FIG. 4A with the prediction horizon 40 for the pitch actuation signal over the predicted period, the predicted time series $x(n)$ (42) of the pitch signal is used to compute the power spectrum $S_X(\omega)$ of the signal $x(n)$:

$$S_X(\omega) = \frac{(\Delta t)^2}{T} \left| \sum_{n=1}^{N} x(n) e^{-j\omega n} \right|^2$$

where $\omega$ refers to the frequency in the transformed space, $\Delta t$ is the sample time step and T the time span of the prediction horizon.

Next, the power spectral moments of $x(k)$ may be computed from $S_X(\omega)$ as follows:

$$\lambda_m = \frac{1}{\pi} \int_0^\infty \omega^m S_X(\omega) d\omega$$

where $\lambda_m$ denotes the m'th spectral moment of $x(n)$. Now, the expected fatigue damage rate d can be found using Benasciutti's approximation as follows:

$$d \approx \frac{1}{2\pi} \sqrt{\frac{\lambda_4}{\lambda_2}} \frac{1}{K} (2\sqrt{2\lambda_0})^k \Gamma\left(1 + \frac{k}{2}\right)(b + (1-b)\alpha_2^{k+1})$$

where $$b = \frac{(\alpha_1 - \alpha_2)(1.112(1 + \alpha_1\alpha_2 - (\alpha_1 + \alpha_2))e^{2.11*\alpha_2} + (\alpha_1 - \alpha_2)}{(\alpha_2 - 1)^2}$$

and $$\alpha_1 = \frac{\lambda_1}{\sqrt{\lambda_0\lambda_2}}, \alpha_2 = \frac{\lambda_2}{\sqrt{\lambda_0\lambda_4}}$$

In the equations above, $\Gamma(\cdot)$ denotes the Gamma, K and k are material constants, with k being the Wöhler coefficient.

In the optimization cost function, the function $f(u, y)$ may be set as $f(u, y)=d$. In this manner a predicted damage contribution over the prediction horizon can be determined from the spectral moments obtained from the prediction horizon of the predicted operational trajectory of the signal in question.

Typically, the optimization problem is formulated in terms of an objective function (a cost function) as well as a number of constraints (e.g., max/min limits, rate-of-change limits, etc.). When applying such a control scheme for normal operation, the objective function is typically formulated to provide a trade-off between loads and power production, and with certain operating parameters such as rotor speed, pitch position and speed, and generator torque being governed by constraints.

In an example embodiment, the optimization problem used for normal production has the form:

$$u^*(t) = \text{argmin } J_0(S(t), P(t), u(t)),$$

subject to the constraints:

$$\omega_R \leq \Gamma_{\omega_R}$$

$$-5 \leq \theta_i \leq 90, i \in \{1, 2, 3\}$$

$$-20 \leq \dot{\theta}_i \leq 20, i \in \{1, 2, 3\}$$

$$P_E \leq 3 \text{ MW}$$

$$\frac{f(u, y)}{N} \leq \text{Damage rate limit}$$

The function argmin is the standard mathematical operator which stands for argument of the minimum, and finds points in the parameter space spanned by S, P, u and t where the cost function $J_0$ attains its smallest value. The parameter $\Gamma_{\omega_R}$ denotes the rated rotor speed, $\theta_i$ the pitch angle (with derivative) and $P_E$ refers to the rated power of the turbine. A damage signal is defined as the fatigue load measure $f(u,y)$ divided by the number of cycles N, and it is specified that the damage signal should be below a given damage rate limit.

Here, the nominal cost function $J_0$ provides a trade-off between power (P) and loads (S) using the control signal $u(t)$, while the constraints limit the rotor speed, blade pitch angle, blade pitch speed, electrical power and fatigue impact over the prediction horizon. The control signal would typically consist of blade pitch angles and power reference for the converter:

$$u(t) = \begin{bmatrix} \theta_1(t) \\ \theta_2(t) \\ \theta_3(t) \\ P_{ref}(t) \end{bmatrix}$$

By implementing in the controller an MPC routine to calculate the control trajectory an optimization problem over N time steps (the control and prediction horizon) is solved. The result is an optimal input sequence for the entire horizon which on one hand may be used for controlling the turbine during operation, but on the other hand will give a measure of the fatigue damage the given control imposes on a given component.

Figure 5:
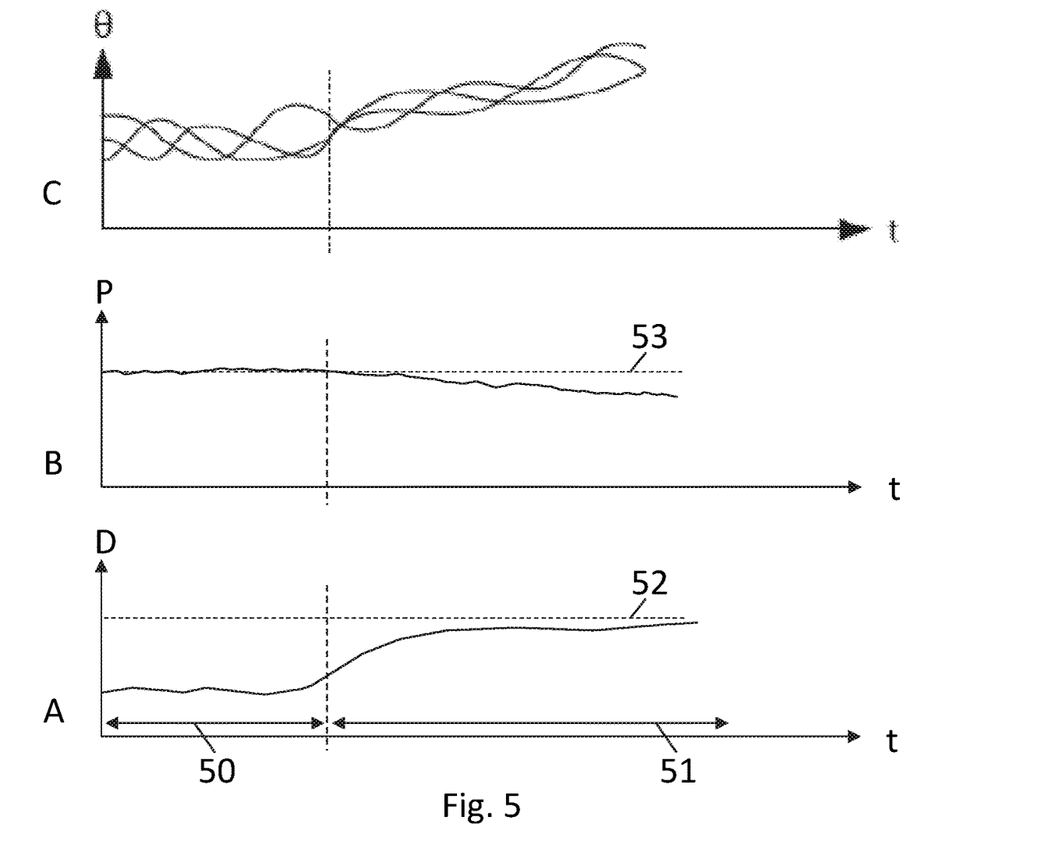
FIG. 5 illustrates example trajectories in a situation where the damage signal D changes from a low level to a higher level.

FIG. 5 illustrates example trajectories in a situation where the damage signal D changes from a low level in a first time period 50 to a higher level in a second time period 51. The damage signal is shown in FIG. 5A. The damage limit is indicated by reference numeral 52.

In the first time period where the damage signal is low, power production is prioritized over reducing the fatigue impact further. Thus the power production is maintained at rated power 53 as shown in FIG. 5B. FIG. 5C shows an example of the pitch signal for the three blades. At a certain point in time, the damage signal increases. This results in that the optimization routine prioritizes keeping the damage signal below the damage level over produced power, and the power production is decreased below rated. Reduction of the produced power is obtained by increasing the pitch angle as shown in FIG. 5C.

Figure 6:
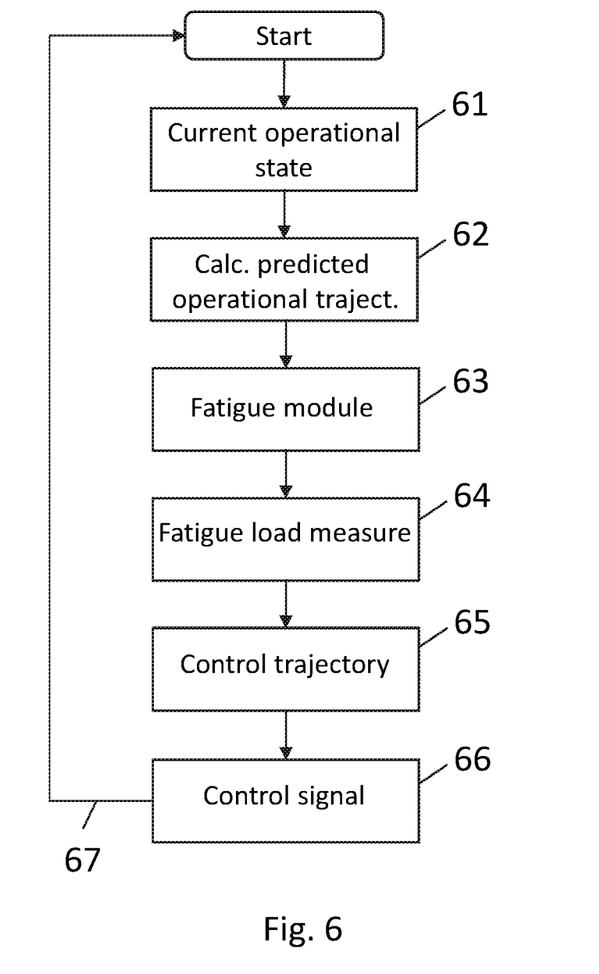
FIG. 6 illustrates a flow diagram of elements of the invention.

FIG. 6 illustrates elements of a flow diagram showing steps used to control a wind turbine to perform various embodiments of the present invention.

The elements may be implemented as computer program product or code being adapted to generating instructions to a controller arranged to control the operation of the wind turbine or components of the wind turbine. The computer program may be provided in any suitable manner. The computer program product is typically stored by and executed by a wind turbine control system.

In a first step 61, the current operational state of the wind turbine is determined or received, and based on the current operational state, one or more predicted operational trajectories are calculated 62.

At least one of the operational trajectories are input into a fatigue module 63 which is programmed to determine at least one fatigue load measure 64 from at least one predicted operational trajectory.

The at least one fatigue load measure is next used to determine 65 a control trajectory. This may e.g. be done by solving the formulated optimization problem using the defined cost function. In this regard the fatigue load measure may be used as an element in the cost function and/or as a constraint of the optimization. Control signals 66 are generated for the various actuators of the turbine based on the determined control trajectory, and the method is run again 67.

In further embodiments, the general aspects of the embodiments of the present invention may be implemented in a wind turbine park controller arranged for controlling one or more wind turbines of a wind turbine park. In such embodiment, the wind park controller may control one or more selected wind turbines. In such embodiment, the wind turbine controller may be implemented in a distributed manner, where parts of the controller are implemented in the wind turbine whereas other parts of the controller are implemented in the wind park controller.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine, comprising:
receiving a current operational state of the wind turbine;
based on the current operational state, calculating one or more predicted operational trajectories, the one or more predicted operational trajectories including a predicted control trajectory comprising a time series of at least one variable;
determining at least one predicted fatigue load measure from the one or more predicted operational trajectories, wherein the one or more predicted operational trajectories comprise a receding horizon trajectory with a prediction horizon, and wherein the at least one predicted fatigue load measure is determined for the prediction horizon;
determining fatigue experienced by the wind turbine for a plurality of time periods, over a past period, to determine a historic fatigue measure;
determining a current fatigue measure;
determining a control trajectory based on the current fatigue measure, the at least one predicted fatigue load measure, and the historic fatigue measure; and
controlling the wind turbine based on a first predicted value of the control trajectory.

2. The method according to claim 1, wherein the one or more predicted operational trajectories are calculated by optimizing at least one cost function, and wherein the at least one fatigue load measure is included in the cost function.

3. The method according to claim 1, wherein the one or more predicted operational trajectories are calculated by optimizing at least one cost function, and wherein the at least one fatigue load measure is included in the optimization as one or more constraints.

4. The method according to claim 1, wherein the at least one fatigue load measure includes a rainflow count algorithm.

5. The method according to claim 4, wherein the at least one fatigue load measure is based on a damage signal determined from a Palmgren-Miner sum.

6. The method according to claim 1, wherein the at least one fatigue load measure is based on spectral moments.

7. The method according to claim 2, wherein the cost function comprises a weighted element including the at least one fatigue measure.

8. The method according to claim 7 wherein the weight is correlated with the historic fatigue measure.

9. The method according to claim 2, wherein an optimization criteria used to optimize the at least one cost function is an optimization criterion to keep the fatigue measure under a predefined level.

10. The method according to claim 1, wherein the current operational state of the wind turbine is obtained based on sensor readings from sensors arranged to measure sensor data relating to a physical state of the wind turbine.

11. A computer program product comprising software code adapted to control a wind turbine when executed on a data processing system, the computer program product being adapted to:
receive a current operational state of the wind turbine;
based on the current operational state, calculate one or more predicted operational trajectories, the one or more predicted operational trajectories including a predicted control trajectory comprising a time series of at least one variable;
determine at least one predicted fatigue load measure from the one or more predicted operational trajectories, wherein the one or more predicted operational trajectories comprise a receding horizon trajectory with a prediction horizon, and wherein the at least one predicted fatigue load measure is determined for the prediction horizon;
determine fatigue experienced by the wind turbine for a plurality of time periods, over a past period, to determine a historic fatigue measure;
determine a current fatigue measure;
determine a control trajectory based on the current fatigue measure, the at least one predicted fatigue load measure, and the historic fatigue measure; and calculate a control signal based on a first predicted value of the control trajectory to control the wind turbine.

12. A control system for a wind turbine, comprising:
a controller arranged for receiving a current operational state of the wind turbine and based on the current operational state calculate one or more predicted operational trajectories, the one or more predicted operational trajectories including a predicted control trajectory comprising a time series of at least one variable;
wherein the controller system is further arranged to:
   determine at least one predicted fatigue load measure from the one or more predicted operational trajectories, wherein the one or more predicted operational trajectories comprise a receding horizon trajectory with a prediction horizon, and wherein the at least one predicted fatigue load measure is determined for the prediction horizon;
   determine fatigue experienced by the wind turbine for a plurality of time periods, over a past period, to determine a historic fatigue measure;
   determine a current fatigue measure;
   determine a control trajectory based on the current fatigue measure, the at least one predicted fatigue load measure, and the historic fatigue measure; and
   control the wind turbine based on a first predicted value of the control trajectory.

13. A wind turbine park controller arranged for controlling one or more wind turbines of a wind turbine park, the wind turbine park controller comprising:
a controller arranged for receiving a current operational state of the wind turbine and based on the current operational state calculate one or more predicted operational trajectories, the one or more predicted operational trajectories including a predicted control trajectory comprising a time series of at least one variable;
wherein the controller system is further arranged to:
   determine at least one predicted fatigue load measure from the one or more predicted operational trajectories, wherein the one or more predicted operational trajectories comprise a receding horizon trajectory with a prediction horizon, and wherein the at least one predicted fatigue load measure is determined for the prediction horizon;
   determine fatigue experienced by the wind turbine for a plurality of time periods, over a past period, to determine a historic fatigue measure;
   determine a current fatigue measure;
   determine a control trajectory based on the current fatigue measure, the at least one predicted fatigue load measure, and the historic fatigue measure; and
   determine a control trajectory based on both the at least one predicted fatigue load measure and the historic fatigue measure; and
   control the wind turbine based on a first predicted value of the control trajectory.

14. The method according to claim 1, further comprising:
wherein the determining the fatigue experienced by the wind turbine for the plurality of time periods occurs as part of a monitoring operation of the wind turbine.

15. The method of claim 1, wherein determining fatigue experienced by the wind turbine comprises estimating fatigue experienced by the wind turbine based on one or more measured values.

* * * * *